(12) United States Patent
Colebrooke (10) Patent No.: US 12,540,676 B2
(45) Date of Patent: Feb. 3, 2026

(54) FLUID CONTROL VALVE

(71) Applicant: ROLLS-ROYCE plc, London (GB)

(72) Inventor: Jack F. Colebrooke, Bristol (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/747,647

(22) Filed: Jun. 19, 2024

(65) Prior Publication Data
US 2025/0020217 A1   Jan. 16, 2025

(30) Foreign Application Priority Data

Jul. 14, 2023   (GB) ..................................... 2310835

(51) Int. Cl.
| | |
|---|---|
| F16K 1/24 | (2006.01) |
| F01D 17/14 | (2006.01) |
| F02K 1/15 | (2006.01) |
| F16K 1/16 | (2006.01) |
| F16K 1/52 | (2006.01) |
| F16K 1/54 | (2006.01) |

(52) U.S. Cl.
CPC .............. *F16K 1/24* (2013.01); *F01D 17/148* (2013.01); *F02K 1/15* (2013.01); *F16K 1/16* (2013.01); *F16K 1/52* (2013.01); *F16K 1/54* (2013.01)

(58) Field of Classification Search
CPC ..... F16K 1/24; F16K 1/54; F16K 1/16; F02K 1/15; F01D 17/148
See application file for complete search history.

(56) References Cited

U.S. PATENT DOCUMENTS

| | | | |
|---|---|---|---|
| 3,946,986 A | 3/1976 | Sutter et al. | |
| 4,428,356 A | 1/1984 | Kemmner | |
| 6,024,125 A * | 2/2000 | Baumann ............... | F16K 1/2021 251/360 |
| 9,004,450 B2 * | 4/2015 | Bolanahalli ........... | F16K 5/0407 251/301 |
| 11,841,089 B2 * | 12/2023 | Shorback ................ | F16K 27/04 |
| 11,946,557 B2 * | 4/2024 | Shorback .................. | F16K 3/22 |
| 11,953,113 B2 * | 4/2024 | Shorback ................ | F16K 3/314 |
| 2020/0080658 A1 * | 3/2020 | Waddell ................ | F01D 17/148 |
| 2021/0254493 A1 | 8/2021 | Jones et al. | |

FOREIGN PATENT DOCUMENTS

GB   1463697 A   2/1977

OTHER PUBLICATIONS

European search report dated Nov. 19, 2024, issued in EP Patent Application No. 24182157.8.
Great Britain search report dated Feb. 13, 2024, issued in GB Patent Application No. 2310835.0.

* cited by examiner

*Primary Examiner* — Marina A Tietjen
(74) *Attorney, Agent, or Firm* — Barnes & Thornburg (57) ABSTRACT

A fluid control valve is disclosed, comprising: a valve body defining an outer wall for a curved flow path through the fluid control valve; and a valve element defining an opposing inner wall and rotatable relative to the valve body about a pivot point through between a closed position a range of open positions. A separation between the first inner wall and the outer wall along a restrictor portion of the flow path varies between open positions. The first inner wall and the outer wall are cooperatively defined so that for at least some open positions the separation between the first inner wall and the outer wall is constant along the respective restrictor portion of the flow path.

17 Claims, 4 Drawing Sheets

FLUID CONTROL VALVE

CROSS-REFERENCE TO RELATED APPLICATIONS

This specification is based upon and claims the benefit of priority from United Kingdom Patent Application No. GB 2310835.0, filed on 14 Jul. 2023, the entire contents of which is hereby incorporated herein by reference.

BACKGROUND

Technical Field

The present disclosure relates to a fluid control valve.

Description of the Related Art

Various types of fluid control valves are known with differing advantages and disadvantages. Typically, the mechanical configuration of a fluid control valve is such that an input actuation has a non-linear relationship with an output effect, such as an area of a flow restriction through the fluid control valve or an associated flow rate. The non-linear relationship typically arises since known fluid control valves use rotating elements which turn to expose a variable-area opening. Such fluid control valves include a ball valve, butterfly valve, a quarter-turn control valve, which are driven by a rotary actuator. It is known to provide controllers for such fluid control valves to provide a calibrated response despite the non-linear operation. For example, such controllers may be configured to determine a rotary input for the control valve based on a received demand signal, in order to achieve a desired output effect. The determination may be based on a predetermined mapping of input to output (e.g., of actuator position to an output effect such as flow area or flow rate), or may use a feedback loop to target a desired output effect (e.g. a desired flow rate).

Linear-actuated valves are also known and may provide a natural linear relationship between an input actuation and the output effect. Example linear-actuated valves include sliding stem valves or multi-turn valves. However, such linear-actuated valves typically require additional installation space to accommodate the actuator, and may only have a linear response over part of their operating range.

SUMMARY

According to a first aspect of the present disclosure, there is provided a fluid control valve comprising: a valve body defining an outer wall for a curved flow path through the fluid control valve; a valve element rotatable relative to the valve body about a pivot point, through a rotatable travel, between a closed position in which the flow path is closed, and a range of open positions in which an outlet is defined between the valve element and valve body; wherein the valve element defines a first inner wall configured to oppose the outer wall when in the range of open positions to define a restrictor portion of the flow path; wherein a separation between the first inner wall and the outer wall along the restrictor portion of the flow path varies through the range of open positions; and wherein the first inner wall and the outer wall are cooperatively defined so that, for at least some open positions in the range of open positions, the separation between the first inner wall and the outer wall is constant along the respective restrictor portion of the flow path.

It may be that the first inner wall and the outer wall are cooperatively defined so that, for each open position in the range of open positions, the separation between the first inner wall and the outer wall is constant along the respective restrictor portion of the flow path.

It may be that the outer wall defines a throat point; and the first inner wall has an angular extent corresponding to rotation of the valve element through the rotatable travel to oppose the throat point. It may be that the radius of the first inner wall relative to the pivot point varies over its angular extent to vary the separation between the first inner wall and the outer wall through the range of open positions.

It may be that the first inner wall angularly extends from a closure point configured to engage the throat point in the closed position, to a terminal point corresponding to a maximum separation between the throat point and the first inner wall within the rotatable travel of the valve element.

It may be that the radius of the first inner wall relative to the pivot point reduces over its angular extent from a maximum radius at a closure point configured to engage the throat point in the closed position.

It may be that the radius of the first inner wall relative to the pivot point reduces at a constant rate with respect to its angular extent.

In other words, along the angular extent of the first inner wall, the radius to each respective point reduces at a constant rate per unit angle. Where the first inner wall has a closure point as defined above, the radius of the first inner wall relative to the pivot point may reduce in constant proportion to an angular offset from the closure point (e.g., the radius to each respective point along the angular extent of the first inner wall may reduce in constant proportion to the angular offset between the respective point and the closure point).

It may be that the first inner wall is defined by a curve and the centre of curvature varies along the curve; and the outer wall is defined by a curve which corresponds to the first inner wall so that, for at least some open positions in the range of open positions, a restrictor portion of the outer wall is defined by a locus of points that (i) share a common centre of curvature with a respective point on the first inner wall and (ii) are separated from the respective point on the first inner wall by a separation which is constant along the restrictor portion of the outer wall.

It may be the curve defining the outer wall corresponds to the first inner wall so that, for each open position in the range of open positions, a restrictor portion of the outer wall is defined by a locus of points that (i) share a common centre of curvature with a respective point on the first inner wall and (ii) are separated from the respective point on the first inner wall by a separation which is constant along the restrictor portion of the outer wall.

The expression "restrictor portion" relates to the portion of the respective element (e.g., the outer wall, or inner wall) which corresponds to (e.g., defines) the restrictor portion of the flow path.

It may be that the first inner wall is defined by a curve and the centre of curvature varies along the curve to define an evolute of the first inner wall; and the outer wall is defined by a curve which corresponds to the first inner wall so that, for at least some open positions or for each open position in the range of open positions, a restrictor portion of the outer wall and a restrictor portion of the inner wall are concentric curves with common evolutes.

It may be that the first inner wall and a portion of the outer wall are defined to lie along a common curve when the first inner wall is in the closed position, the common curve having an angular extent about the pivot point of the valve member, the common curve having a variable radius relative to the pivot point which monotonically varies along the angular extent of the common curve at a constant non-zero rate. Accordingly, rotation of the valve element from the closed position to an open position may cause a restrictor portion of the first inner wall to oppose a restrictor portion of the outer wall to define the restrictor portion of the flow path, with the separation therebetween being constant along the restrictor portion of the flow path.

Varying monotonically along the angular extent at a constant non-zero rate is considered to be mathematically clear and precise, with the intended meaning that the radius increases (or decreases) at a constant rate per unit angle. It may otherwise be expressed as increasing (or decreasing) in proportion to angle along the extent along the curve.

It may be that the valve element comprises a second inner wall of constant radius relative to the pivot point. The second inner wall may be configured to oppose the outer wall in the closed position to delimit the flow path through the fluid control valve. The valve body may define a sealing element configured form a seal with the second inner wall; and the fluid control valve may be configured so that rotation of the valve element from the closed position through the rotational travel causes the second inner wall to be progressively occluded from the flow path by the sealing element while maintaining the seal.

It may be that the first and second inner wall extend in opposite angular directions from a closure point configured to engage a throat point of the outer wall in the closed position.

It may be that the valve element is coupled to a rotary actuator so that an area of the valve opening varies at a constant rate in proportion to a turning angle of the rotary actuator.

According to a second aspect of the present disclosure, there is provided a propulsion device comprising a fluid control valve in accordance with the first aspect, with the valve element coupled to a rotary actuator so that an area of the valve opening varies at a constant rate in proportion to a turning angle of the rotary actuator.

It may be that the fluid control valve is configured to control a cooling flow to a component of the propulsion device.

The propulsion device may comprise a variable-geometry component driven by a rotary actuator to vary a thermal load of the variable-geometry component or of an associated component, and the fluid control valve may be configured to control a cooling flow to the variable-geometry component or the associated component. It may be that the rotary actuator for the variable-geometry component provides the rotary actuator of the fluid control valve or is configured to drive rotation of the rotary actuator of the fluid control valve.

The variable-geometry component may be a nozzle for an exhaust flow of the propulsion device.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
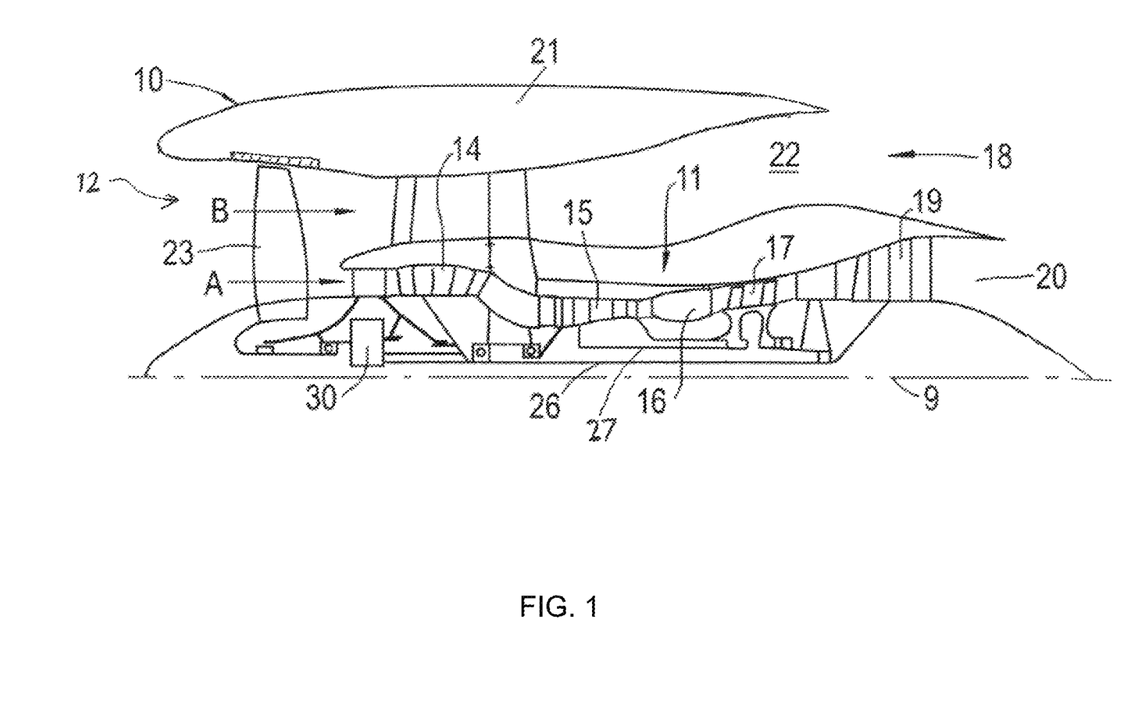
FIG. 1 is a schematic sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2A:
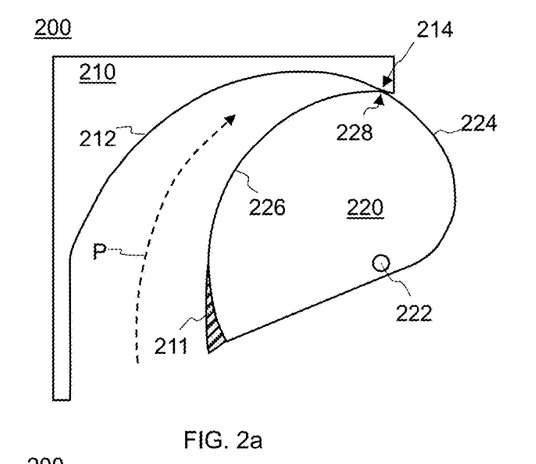
FIG. 2a is a schematic sectional view of a fluid control valve in a closed position.
Figure 2B:
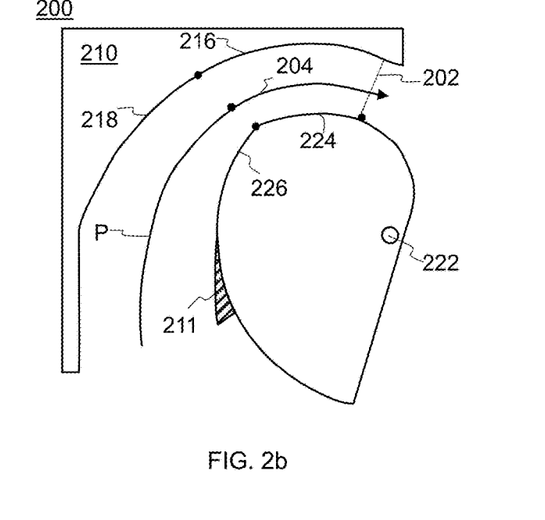
FIG. 2b is a schematic sectional view of a fluid control valve in a first open position.
Figure 2C:
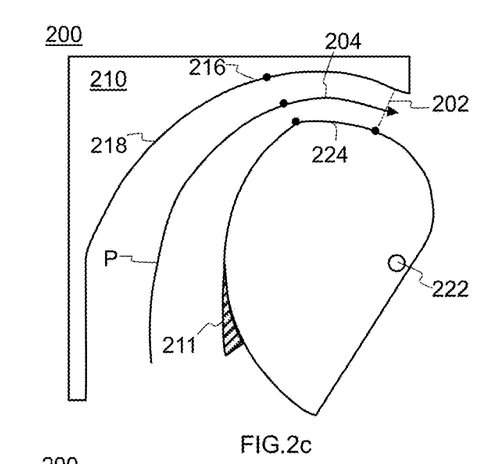
FIG. 2c is a schematic sectional view of a fluid control valve in a second open position.
Figure 2D:
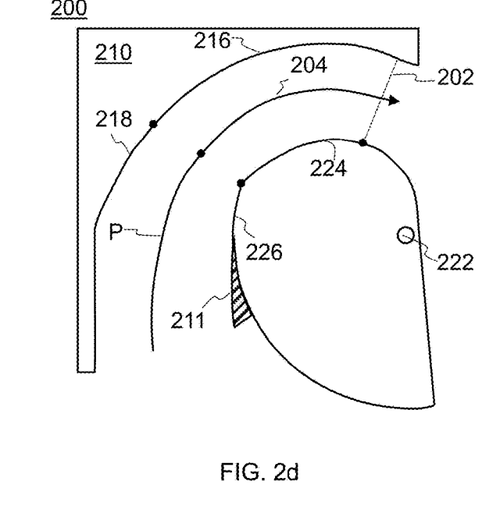
FIG. 2d is a schematic sectional view of a fluid control valve in a third open position.

FIGS. 2a-2d schematically show a fluid control valve 200 comprising a valve body 210 and a valve element 220, which cooperatively define a flow path P for a fluid. FIG. 2a shows the fluid control valve with the valve element 220 in a closed position which prevents fluid flow therethrough, and as such the flow path P is stopped and indicated in dashed lines. FIGS. 2b-2d show the fluid control valve with the valve element 220 in open positions, such that the flow path P extends through the fluid control valve to be discharged through an open throat 202 (or outlet).

The valve element 220 is rotatable relative to the valve body 210 about a pivot point 222 through a rotatable travel. The expression rotatable travel refers to an angular extent through which the valve element 220 is rotatable. The rotatable travel includes the closed position illustrated in FIG. 2a, and a range of open positions including those illustrated in FIGS. 2b-2d. In this example, the rotatable travel is approximately 90°, extending anti-clockwise in the orientation of FIGS. 2a-2d from the closed position. In variant examples, a rotatable travel may be greater or less.

The flow path P is curved as shown in FIGS. 2a-2d, and is defined between an outer wall 212 of the valve body 210 and the valve element 220.

In this example, the valve element 220 has two walls with respective functions. A first inner wall 224 is configured to oppose a downstream portion of the outer wall 212 when the valve element is in an open position of the range of open positions (e.g., any open position of the range of open positions). A second inner wall 226 is configured to oppose a remaining upstream portion the outer wall 212. With reference to the flow path P, the first inner wall 224 may be considered to be generally downstream, and the second inner wall 226 may be considered to be generally upstream. In the example of FIGS. 2a-2d, the first inner wall 224 and the second inner wall 226 are contiguous and meet at a closure point 228. The closure point 228 is configured to engage a throat point 214 on the outer wall when the valve element is in the closed position, and therefore has a radius relative to the pivot point 222 equal to the distance from the pivot point 222 and the throat point.

As shown in FIG. 2a, the closure point 228 is at an upstream end of the first inner wall 224, and so the inner wall 224 does not oppose a downstream portion of the outer wall 212 in the closed position. Accordingly, the outer wall 212 is opposed by the second inner wall 226 (e.g., only by the second inner wall 226) when the valve element is in the closed position.

As shown in the sequence of FIGS. 2a-2d, rotation of the valve element 220 about the pivot point 222 from the closed position (anticlockwise in the specific example) causes the closure point 228 to separate from the throat point 214 on the outer wall, revealing the open throat 202 of FIGS. 2b-2d.

This rotation also causes the first inner wall 224 to move upstream so as to oppose a respective downstream portion 216 of the outer wall 212 and thereby define a restrictor portion 204 of the flow path P. The downstream portion 216 of the outer wall is referred to in the further discussion as a restrictor portion 216 of the outer wall. FIGS. 2b-2d each include marks demarcating corresponding boundaries between (i) the restrictor portion 216 and remaining portion 218 of the outer wall 212; (ii) the first inner wall 224 and the second inner wall 226 (at the closure point 228); (iii) a restrictor portion of the first inner wall 224 that opposes the outer wall 212 and a remaining portion of the first inner wall 224 that extends beyond the open throat 202; and (iv) the restrictor portion 204 of the flow path P and a remaining upstream portion of the flow path P. As shown through the sequence of FIGS. 2b-2d, the restrictor portion 204 of the flow path, the corresponding restrictor portion 216 of the outer wall 212, and the restrictor portion of the first inner wall each have a variable extent, corresponding to how much the first inner wall 224 extends into the valve body upstream of the open throat 202.

In this example, the fluid control valve is configured so that a separation between the first inner wall 224 and the restrictor portion 216 of the outer wall 212 is constant along the restrictor portion 204 of the flow path P. The expression "separation" refers to the shortest distance of separation between a point on either wall and any other point on the opposing wall, such the separation can be measured along any part of the respective walls. In this example, the inner wall and outer wall are defined so that the separation corresponds to a line which is normal to both walls, since opposing points on the respective walls share a common centre of curvature as will be discussed further below. The example fluid control valve is configured to provide a constant separation for each open position of the range of open positions, but in variant examples there may only be a constant separation for a subset of the open positions.

By providing a constant separation along the restrictor portion 204 of the flow path P, the fluid control valve provides a reliable flow restriction formed over an appreciable extent of the flow path, as opposed to other valve configurations which may provide an abrupt flow restriction or necking of a flow path at a single point along the flow path. A smooth transition along the flow path, and in particular the restrictor portion, may reduce churn and thereby increase a discharge coefficient, as compared with an abrupt restriction.

Although constant at each respective open position, the separation along the flow path varies between open positions, as shown in FIGS. 2b-2d, which illustrate a progressively increasing separation as the valve element 224 rotates into the valve body from the closed position.

FIGS. 2a-2d also show a sealing element 211 of the valve body, which is configured to seal with the second inner wall 226 throughout the rotatable travel of the valve element. The sealing element has an arcuate face of constant radius relative to the pivot point 222, which is configured to oppose the second inner wall 226. The second inner wall 226 has the same constant radius relative to the pivot point 222.

The sealing element 211 is disposed at an upstream location of the flow path and is configured to provide a continuous surface over the sealing element 211 and the valve element 226 for the flow path P. In particular, the sealing element 211 is configured so that rotation of the valve element from the closed position through the rotational travel causes the second inner wall 226 to be progressively occluded from the flow path P through the by the sealing element 211, while maintaining a seal between the sealing element 211 and the second inner wall 226.

Figure 3:
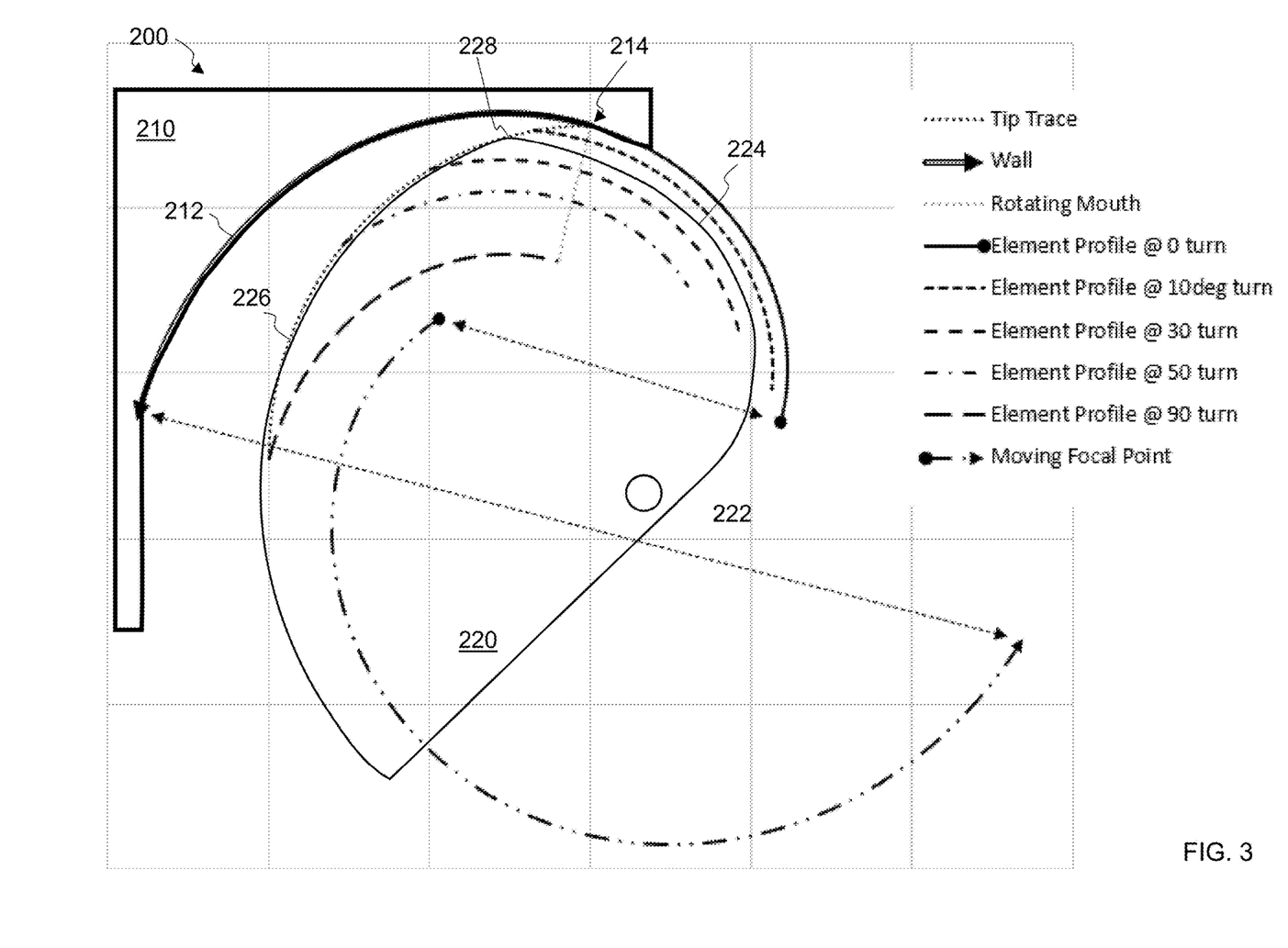
FIG. 3 overlays a schematic sectional view of a fluid control valve with plots of valve wall positions.

FIG. 3 schematically shows the example fluid control valve 200 of FIG. 2 with the valve element 220 rotated about the pivot point 22 to an open position such that the closure point 228 of the valve element 220 is separated from the throat point 214 of the outer wall 212. The first inner wall 224 opposes a corresponding downstream restrictor portion of the outer wall 212, whereas the second inner wall 226 opposes a remaining upstream portion of the outer wall. FIG. 3 shows the fluid control valve 200 overlaid with plots of various positions of the first inner wall 224, which are shown in isolation in FIG. 4 and will be further described with respect to FIG. 4. FIG. 3 is therefore provided to aid the reader in mapping the respective plots to the structure of the control valve as described above with respect to FIG. 2.

Figure 4:
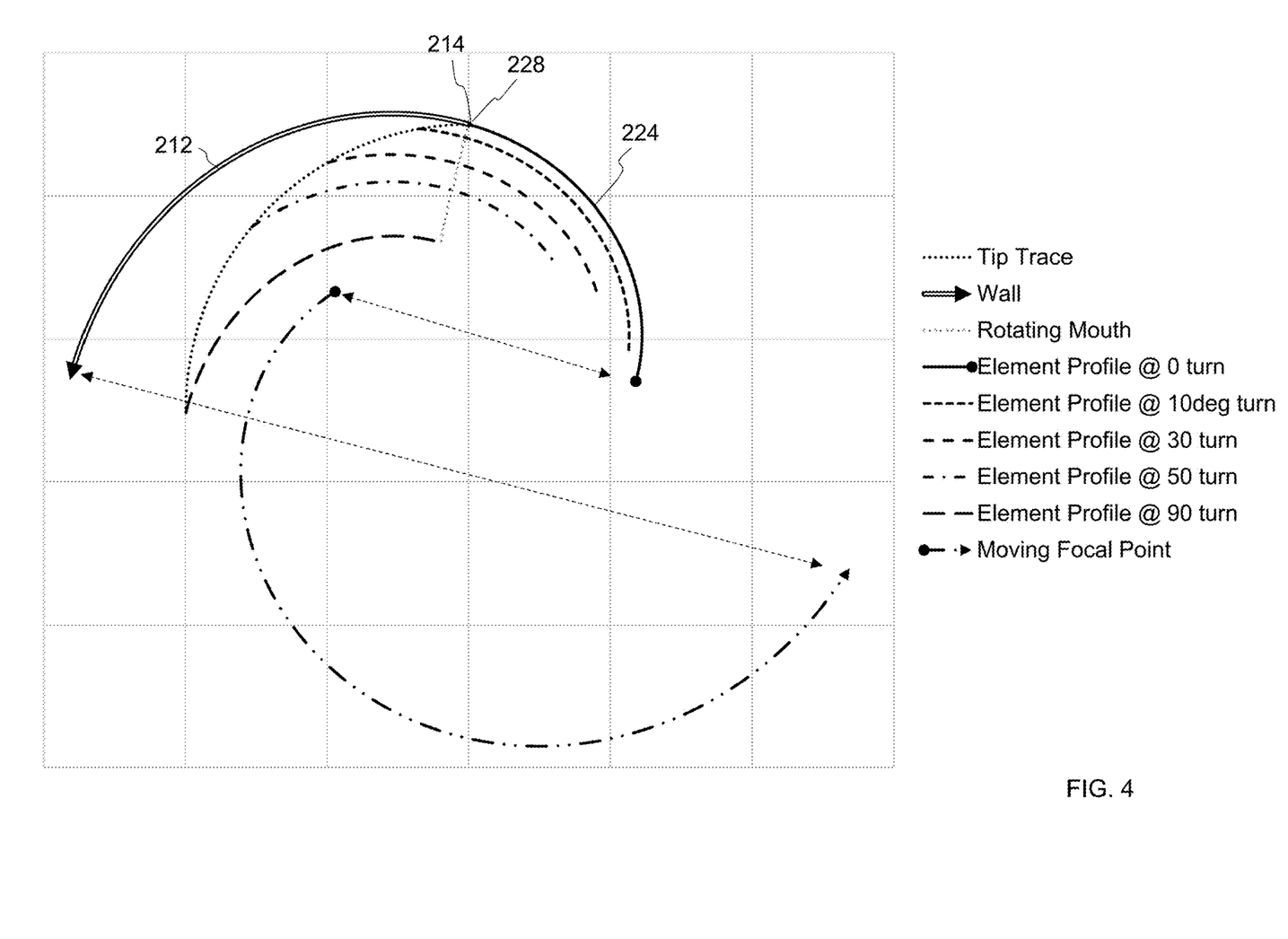
FIG. 4 shows the plots of FIG. 3 without the overlaid view of the fluid control valve.

Referring now to FIG. 4, the plot includes a compound (double) line illustrating the profile of the outer wall 212 of the valve body as described above. As shown, the profile of the outer wall 212 is continuous and contiguous with a profile of the first inner wall 224 when the valve element is in the closed position, with the two profiles meeting so that the throat point 214 and closure point 228 abut (as described above). The profile of the first inner wall 224 in the closed position is shown in a solid line, and described in the legend for the plot as "Element Profile @ 0 turn", which corresponds to 0° rotation from the closed position. As is apparent from FIG. 4, in this example the first inner wall 224 and the outer wall 212 lie on a common curve when in the closed position, and the definition of this curve is further discussed below.

The plot of FIG. 4 additionally shows the profile of the inner wall 224 at various other positions of the valve element, corresponding to rotation from the closed position by 10°, 30°, 50° and 90°. The profiles have different dash types with corresponding annotation in the legend. As can be seen from FIG. 4, the profiles of the inner wall 224 appear to be concentric with each other and with the profile of the outer wall 212.

Although the profiles of the inner wall appear concentric, each line does not have a single centre of curvature. In contrast the common curve defining both the outer wall 212 and the first inner wall 224 (when in the closed position) has an evolute as opposed to a single centre of curvature. An evolute is the locus of the centres of curvatures of a curve. The evolute is shown on FIG. 4 with a dash-double-dot line, and annotated in the legend as "Moving Focal Point". Corresponding points and direction on the common curve and evolute are indicated using a circle at one end and an arrow at the other (further emphasised by the dashed arrows therebetween).

Rotation of the inner wall 224 to depart from the common curve causes it to move radially within the profile of the common curve, and to angularly overlap with the outer wall 212 (to define the restrictor portion of the flow path, as described above). Accordingly, the first inner wall and the outer wall are configured so that, in the range of open positions, the restrictor portion of the outer wall and the restrictor portion of the inner wall form concentric curves with common evolutes (i.e., sharing common centres of curvature). While this discussion is described as met throughout the range of open positions, it is also envisaged that it may be met for a subset of the open positions. The curves can be considered concentric in this context because, for each point along one curve, there is a corresponding point having the same centre of curvature.

In this example, the first inner wall 224 is defined by a curve having a variable radius relative to the pivot point 222. In particular, the radius varies at a constant rate per unit angle (relative to the pivot point), reducing along the angular extent of the first inner wall 224 from the closure point 228. In the particular example illustrated in FIG. 4, the first inner wall 224 is defined to have a maximum radius of 20, and reduces uniformly with angular offset from the closure point 228, at a rate of 0.1 per degree (the numbers 20 and 0.1 are unitless in this example, but any appropriate unit could be used such as millimetres or centimetres). The outer wall 212 has a corresponding definition, increasing at a rate of 0.1 per degree about the pivot point, from the throat point 214 along the angular extent of the outer wall. As such, in the closed position the outer wall and first inner wall lie along a common curve as discussed above.

By providing a uniform variation of radius per unit angle (which may be referred to as a linear relationship between radius and angle or angular extent), rotation of the first inner wall causes it to at least partially lie radially within a corresponding portion of the outer wall to have the concentric arrangement as discussed above, with the corresponding advantages of a constant separation along the respective restrictor portion of the flow path for each open position.

FIG. 4 also shows a trace of how the tip or closure point 228 moves relative to the outer wall 212 through the rotatable travel of the valve element. This is a black close dot line with corresponding annotation in the legend. FIG. 4 also shows a line corresponding to the open throat of the fluid control valve, which is a line normal to the outer wall 212 at the throat point 228, and corresponds to the shortest separation between the throat point 228 and the first inner wall at each open position of the valve element 220. The throat line is a grey close dot line with corresponding annotation in the legend.

To provide a fluid control valve having cooperatively defined walls of the valve element and valve body as described herein, the skilled person may first define a curve for the first inner wall having a radius defined as a function of angular extent about a pivot point. The outer wall may then be defined according to the same curve (the common curve as mentioned above). Otherwise, the outer wall may be defined by first defining the throat point of the outer wall at a location corresponding to the closure point on the first inner wall (i.e., at the end of the first inner wall having a maximum radius relative to the pivot point). The profile of the outer wall may then be defined by progressively rotating the first inner wall, determining a separation between the throat point and the first inner wall at the respective rotational position, and projecting the first inner wall along directions normal to the curvature of the first inner wall by the determined separation. The second inner wall may then be defined as a curve of constant radius relative to the pivot point, equal to the radius of the closure point. The sealing element can be placed on the valve body and defined to have a corresponding sealing wall of equal radius to the second inner wall.

The above description refers to the first inner wall having an angular extent from the closure point. The angular extent of the first inner wall may be considered to extend from the closure point to a terminal point which corresponds to a maximum separation between the throat point and the first inner wall, and which corresponds to the extent of the rotatable travel from the closed position.

Although it has been described that the first inner wall of the valve element does not oppose a downstream portion of the outer wall of the valve body when in the closed position, this is because the outer wall as described herein is considered extend downstream to terminate at the throat point, and the throat point abuts the closure point provided at the upstream end of the first inner wall in the closed position. Accordingly, the first inner wall of the valve element and the outer wall of the valve body may be considered to contact at a point, but not oppose each other over an extent of the flow path as defined herein. Nevertheless, it should be appreciated that the valve body may have a further wall extending downstream beyond the throat point (an outer wall extension), and the first inner wall may oppose and/or abut this outer wall extension in the closed position. The outer wall extension may provide a stop for the first inner wall, such that the first inner wall may engage (e.g., abut and/or rest against) the outer wall extension in the closed position, and such engagement may aid the prevention of flow through the fluid control valve in the closed position.

A fluid control valve as disclosed herein (with reference to FIGS. 2-4) may be coupled to a rotary actuator. In use, the area of the open throat varies at a constant rate in proportion to a turning angle of the rotary actuator, without any need for a controller to provide a mapping between the rotary position of the actuator and a desired throat area.

A fluid control valve as disclosed herein (with reference to FIGS. 2 to 4) may be used with any suitable flow system, for example a flow system of the gas turbine engine of FIG. 1. The fluid control valve may have particular application with systems that are associated with rotary actuation, and in particular systems for which the demand for fluid flow is associated with the rotary actuation. For example, in a propulsion device such as the gas turbine engine of FIG. 1, there may be a variable geometry component driven by a rotary actuator in such a way to vary a thermal load of the variable-geometry component, or of an associated component. By coupling the fluid control valve to control an associated flow (such as a cooling flow for the variable-geometry component or associated component), the delivered flow naturally changes in proportion to the associated thermal demand. Whilst there may be many particular applications, examples of such variable-geometry components include variable flow area nozzles for an exhaust of a gas turbine engine, which may have rotary actuators to vary or accommodate a varying amount of flow therethrough, with such variation corresponding to an increase in thermal load on nozzle components. By providing a fluid control valve as disclosed herein (with reference to FIGS. 2-4), the fluid control valve can be coupled so as to be driven by the same rotary actuator that actuates the moveable nozzle component(s). The fluid control valve may be configured to provide a flow of cooling air to the nozzle component(s) or associated components, for example to provide effusion cooling to such components.

What is claimed is:

1. A fluid control valve comprising:
    a valve body defining an outer wall for a curved flow path through the fluid control valve, the outer wall defining a throat point;
    a valve element, rotatable relative to the valve body about a pivot point, through a rotatable travel, between a closed position in which the flow path is closed, and a range of open positions in which an outlet is defined between the valve element and valve body;
    wherein the valve element defines a first inner wall configured to oppose a downstream portion of the outer wall when in the range of open positions to define a restrictor portion of the flow path, a second inner wall configured to oppose an upstream portion of the outer wall when in the range of open positions, and a closure point where the first inner wall meets the second inner wall configured to engage the throat point on the outer wall when the in the closed position;
    wherein a separation between the first inner wall and the outer wall along the restrictor portion of the flow path varies through the range of open positions;
    wherein the separation is defined as the distance between the first inner wall and the outer wall for each open position included in the range of open positions,
    wherein the restrictor portion of the flow path is defined between the throat point on the outer wall and the closure point on the first inner wall for each open position included in the range of the open positions; and
    wherein the first inner wall and the outer wall are cooperatively defined so that, for at least some open positions included in the range of open positions, the separation between the first inner wall and the outer wall is constant along the restrictor portion of the flow path.

2. The fluid control valve according to claim 1,
    wherein the first inner wall has an angular extent corresponding to rotation of the valve element through the rotatable travel to oppose the throat point; and
    wherein the radius of the first inner wall relative to the pivot point varies over its angular extent to vary the separation between the first inner wall and the outer wall through the range of open positions.

3. The fluid control valve according to claim 2, wherein the first inner wall angularly extends from the closure point configured to engage the throat point in the closed position, to a terminal point corresponding to a maximum separation between the throat point and the first inner wall within the rotatable travel of the valve element.

4. The fluid control valve according to claim 2, wherein the radius of the first inner wall relative to the pivot point reduces over its angular extent from a maximum radius at the closure point configured to engage the throat point in the closed position.

5. The fluid control valve according to claim 2, wherein the radius of the first inner wall relative to the pivot point reduces at a constant rate with respect to its angular extent.

6. The fluid control valve according to claim 1, wherein the first inner wall is defined by a curve and the centre of curvature varies along the curve; and
wherein the outer wall is defined by a curve which corresponds to the first inner wall so that, for at least some open positions in the range of open positions, a restrictor portion of the outer wall is defined by a locus of points that (i) share a common centre of curvature with a respective point on the first inner wall and (ii) are separated from the respective point on the first inner wall by the separation which is constant along the restrictor portion of the outer wall.

7. The fluid control valve according to claim 1, wherein the first inner wall is defined by a curve and the centre of curvature varies along the curve to define an evolute of the first inner wall;
wherein the outer wall is defined by a curve which corresponds to the first inner wall so that, for at least some open positions or for each open position in the range of open positions, a restrictor portion of the outer wall and a restrictor portion of the inner wall are concentric curves with common evolutes.

8. The fluid control valve according to claim 1, wherein the first inner wall and a portion of the outer wall are defined to lie along a common curve when the first inner wall is in the closed position, the common curve having an angular extent about the pivot point of the valve member, the common curve having a variable radius relative to the pivot point which monotonically varies along the angular extent of the common curve at a constant non-zero rate;
whereby rotation of the valve element from the closed position to an open position causes a restrictor portion of the first inner wall to oppose a restrictor portion of the outer wall to define the restrictor portion of the flow path, with the separation therebetween being constant along the restrictor portion of the flow path.

9. The fluid control valve according to claim 1, wherein the second inner wall has a constant radius relative to the pivot point;
wherein the second inner wall is configured to oppose the outer wall in the closed position to delimit the flow path through the fluid control valve,
wherein the valve body defines a sealing element configured form a seal with the second inner wall; and
wherein the fluid control valve is configured so that rotation of the valve element from the closed position through the rotational travel causes the second inner wall to be progressively occluded from the flow path by the sealing element while maintaining the seal.

10. The fluid control valve according to claim 9, wherein the first and second inner wall extend in opposite angular directions from the closure point configured to engage the throat point of the outer wall in the closed position.

11. The fluid control valve according to claim 1, wherein the valve element is coupled to a rotary actuator so that an area of the valve opening varies at a constant rate in proportion to a turning angle of the rotary actuator.

12. A propulsion device comprising the fluid control valve of claim 11.

13. The propulsion device according to claim 12, wherein the fluid control valve is configured to control a cooling flow to a component of the propulsion device.

14. The propulsion device according to claim 12, comprising a variable-geometry component driven by a rotary actuator to vary a thermal load of the variable-geometry component or of an associated component, and
wherein the fluid control valve is configured to control a cooling flow to the variable-geometry component or the associated component, and wherein the rotary actuator for the variable-geometry component provides the rotary actuator of the fluid control valve or is configured to drive rotation of the rotary actuator of the fluid control valve.

15. The propulsion device according to claim 14, wherein the variable-geometry component is a nozzle for an exhaust flow of the propulsion device.

16. The fluid control valve according to claim 1, wherein a separation between the second inner wall and the outer wall increasingly varies along the upstream portion of the flow path for the at least some open positions included in the range of open positions.

17. A fluid control valve comprising:
a valve body defining an outer wall for a curved flow path through the fluid control valve;
a valve element, rotatable relative to the valve body about a pivot point, through a rotatable travel, between a closed position in which the flow path is closed, and a range of open positions in which an outlet is defined between the valve element and valve body, the valve element defining a first inner wall configured to oppose a downstream portion of the outer wall when in the range of open positions to define a restrictor portion of the flow path and a second inner wall configured to oppose an upstream portion of the outer wall when in the range of open positions to define an upstream portion of the flow path upstream of the restrictor portion of the flow path;
wherein a downstream separation between the first inner wall and the outer wall along the restrictor portion of the flow path varies for each open position included in the range of open positions and an upstream separation between the second inner wall and the outer wall along the upstream portion of the flow path varies for each open position included in the range of open positions; and
wherein the downstream separation between the first inner wall and the outer wall is constant along the restrictor portion of the flow path for at least some open positions included in the range of open positions; and
wherein the upstream separation between the second inner wall and the outer wall increasingly varies along the upstream portion of the flow path for the at least some open positions included in the range of open positions.

* * * * *